April 29, 1952 — F. E. KUNZLER — 2,594,457
APPARATUS FOR SCRIBING
Filed Sept. 3, 1948 — 2 SHEETS—SHEET 1

INVENTOR.
FRED E. KUNZLER.
BY
Bartlett, Eyre, Keel & Weymouth.
ATTORNEYS

April 29, 1952 F. E. KUNZLER 2,594,457
APPARATUS FOR SCRIBING
Filed Sept. 3, 1948 2 SHEETS—SHEET 2
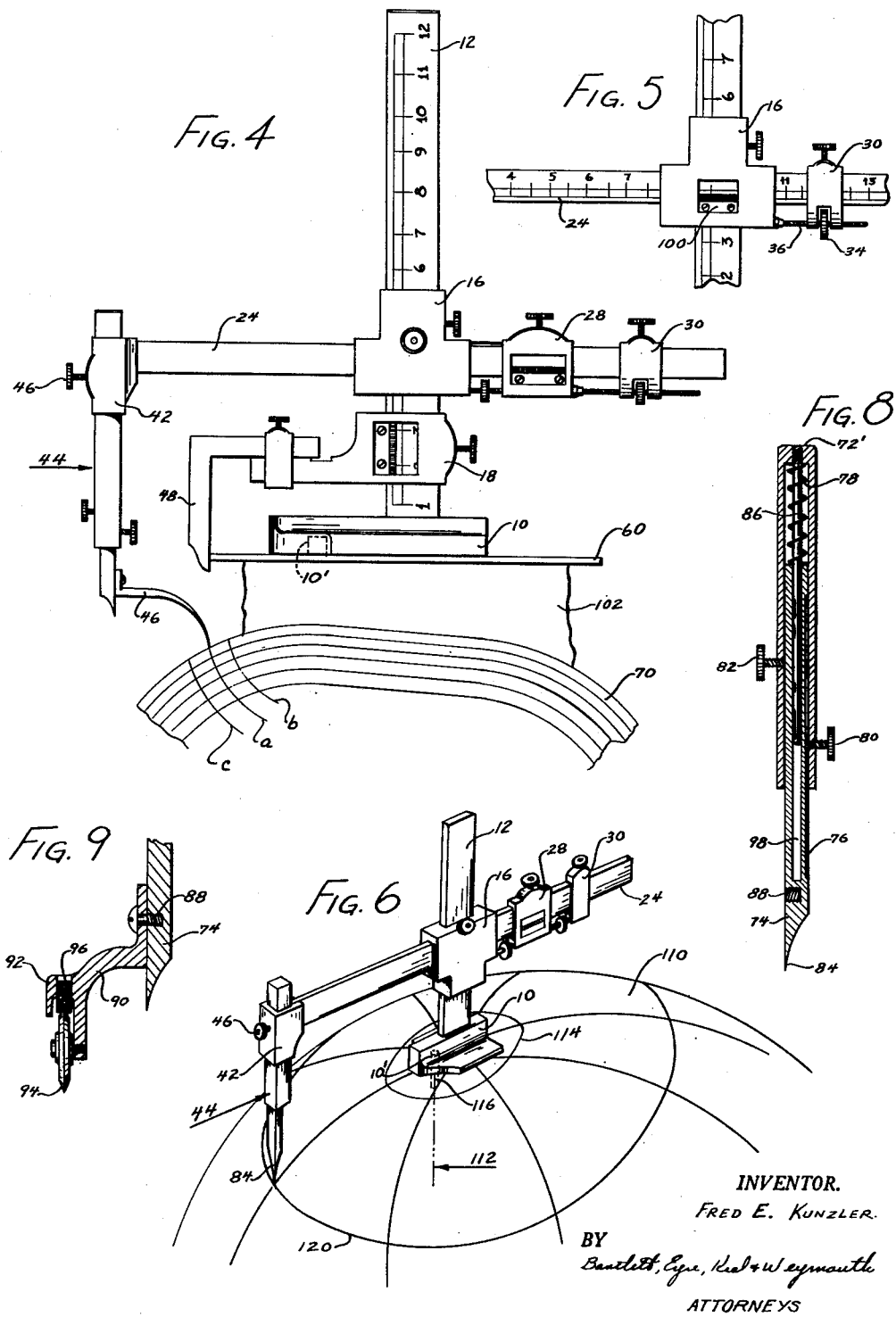
INVENTOR.
FRED E. KUNZLER.
BY
Bartlett, Eyre, Keel & Weymouth
ATTORNEYS Patented Apr. 29, 1952

2,594,457

UNITED STATES PATENT OFFICE 2,594,457

APPARATUS FOR SCRIBING

Fred E. Kunzler, Jamaica, N. Y.

Application September 3, 1948, Serial No. 47,614

7 Claims. (Cl. 33—21)

This invention relates to graphical projections and more particularly to the projection of lines on regular and irregular surfaces.

In many instances, as for example in the manufacture of aircraft, it is often desirable to transfer curved or straight lines onto a curved surface for the purpose of forming openings of a precise shape and size or for trimming curved sections of wing or fuselage coverings or other parts of the aircraft to fit accurately in position. As for example, the wing tip may be pressed or formed from a single sheet of aluminum and the edges of the wing tip are then shaped to closely butt the adjoining edges of the wing covering. To accomplish this a pair of flat templates arranged in spaced alignment are usually made and fixed in a predetermined position in relation to the formed wing tip so that with the use of suitable squares and scribers, the line determined by the templates can be projected perpendicularly thereof onto the wing tip. The procedure of course results in the establishment of a number of points on the wing tip. These points are then joined by the use of French curves to approximate the template curve and the wing tip is then cut or trimmed to that line so that the trimmed edge will fit closely to the adjoining wing covering.

At best the foregoing procedure is a laborious and time consuming one and results only in an approximation since only a finite number of points are determined and the curve is approximated by connecting the points with a curved line.

Still another problem experienced along these lines is the formation of holes in curved surfaces so that a close fit can be obtained between the edges of the hole and an object to be positioned therein. Assume for instance that an opening is to be formed in the nose of an aircraft to accommodate the barrel of a gun when positioned at a predetermined compound angle with the central axis of the nose part. The accomplishment of this task is extremely difficult as templates must be made and properly positioned on the nose so that the procedure of projecting the curve defined by the templates can be accomplished as heretofore described.

With my invention I can accomplish the foregoing problems as well as other similar graphical projection problems very much more rapidly and accurately than with other methods known to me.

Another object of the invention is a novel and improved device for projecting lines on curved surfaces whereby a line can be scribed by means of a single template directly on any desired surface so that an accurate projection of the template or guide will be obtained and whereby any approximation of the line by the use of French curves is avoided.

Still another object is means for scribing true circles on curved surfaces with the axis of the circle in any predetermined position and without the need for templates or other similar equipment.

Another object is a new and improved method for transferring lines determined by flat template onto curved surfaces.

Still another object is a novel and improved apparatus for making graphical projections.

Other objects of the invention will hereinafter appear.

These and other objects will become more apparent in the following description and accompanying drawings in which:

Figs. 3 and 4 are other embodiments of the invention;

Fig. 5 is a fragmentary view of a modification of the invention;

Fig. 6 illustrates one method of using apparatus in accordance with the invention;

Figs. 7 and 8 illustrate two embodiments of a scriber in accordance with the invention; and Fig. 9 is still another modification thereof.

In the drawings like numerals have been applied to similar components in each of the figures.

Figure 1:
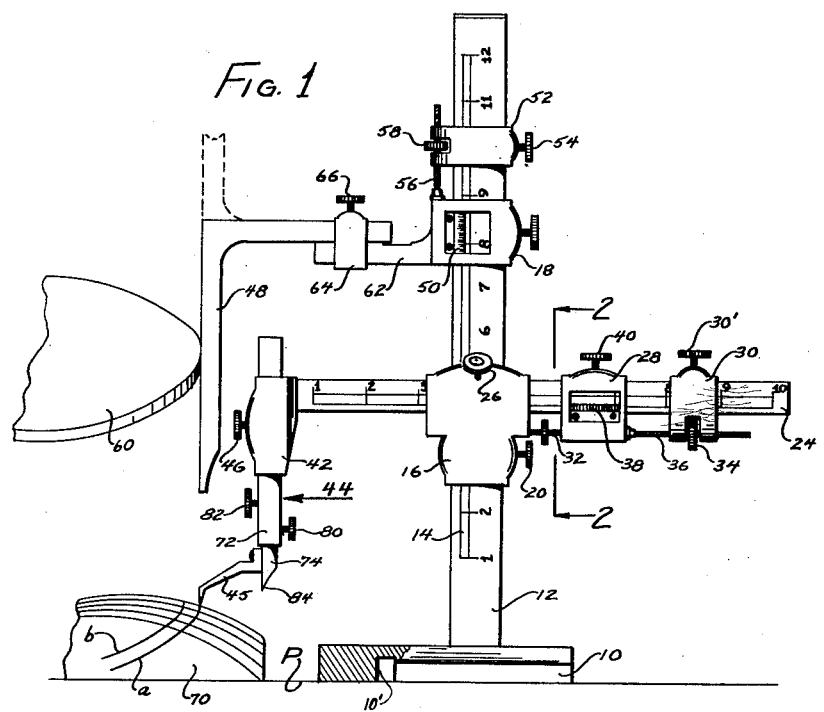
Fig. 1 illustrates one embodiment of the invention.
Figure 2:
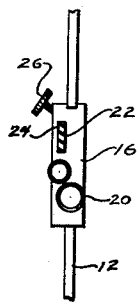
Fig. 2 is a section along the lines 2—2 of Fig. 1.

In Fig. 1 I have illustrated one embodiment of the invention for the projection of a curved line, as determined by a template, onto a curved surface disposed beneath and properly aligned with the template. The apparatus according to this embodiment includes a base member 10 having a flat surface on the underside thereof and an upright calibrated member 12 firmly secured thereto. The member 12 is preferably securely fixed to the base and precisely perpendicular to the flat underside of the base 10. The calibrations 14 on this upright member of column may be in either the British or metric system and arranged so that with a suitable vernier scale measurement and adjustment to within one or two thousandths of an inch should be obtainable.

A hole or recess 10' is formed in the base 10 to snugly receive a pivot pin particularly useful in certain applications such as scribing circular openings on irregular surfaces. Further reference to this pin and the manner in which it may be used will be discussed in more detail in connection with Fig. 6.

The calibrated column 12 which may have any cross section that will provide the desired degree of rigidity, is provided with a pair of cross carriers 16 and 18 for individually and adjustably supporting the guiding and scribing means. The cross carrier 16 is a generally T-shaped member having a vertical passage therein to receive the column member 12. A thumb screw 20 threaded into the cross carrier is used to secure the carrier in position on the column. The member 16 is also provided with a transverse opening 22 which slidably receives a calibrated transverse slide 24. The slide is preferably calibrated in the same manner as the column 12, and is adapted to be locked against transverse movement by a second thumbscrew 26 of the member 16. The transverse position of the slide 24 may be accurately determined and adjusted by means of the vernier scale 28 and its associated locking means 30 both of which slidably engage the slide 24. To adjust the slide, the locking means 30 is fixed to the slide by tightening the thumbscrew 3°′. The vernier 28 is adjusted relative to the cross carrier 16 by the adjustable turnscrew 32. The knurled wheel 34 cooperating with the screw 36 is then rotated to move the slide in one or the other direction as desired with the degree of such movement being indicated by the vernier scale 38 or the vernier 28. To fix the slide 24 in position the thumbscrews 26 and 40 are then tightened.

On the left hand end of the slide 24 is a scriber supporting member 42 having a vertical passage therein preferably at right angles to the slide 24. This member slidably receives a yieldable scribing assembly 44 of the character shown for instance in Figs. 7 and 8 and is provided with a locking screw 46 to hold the assembly therein.

The upper carriage or cross carrier 18 carries the guide 48 and is provided with a vernier scale 50 for cooperation with the calibrators 14 on the column 12. The fine adjustment of this carrier is accomplished by means of the locking member 52, that may be secured in any position on the vertical column 12 by tightening the thumbscrew 54. With the member 52 locked fine adjustment can be obtained by rotating knurled wheel 58 on the screw 56 to move the carrier 18 relative to the column 12.

The guide 48 consists, in this embodiment, of an L-shaped member with the outer edge vertical leg cooperating with the template 60. The horizontal leg of the guide is fastened to the arm 62 of the cross carrier 18 by a device 64 fitted with a thumbscrew 66 encompassing both the guide part and the arm 64 to hold them in an aligned position. The depending arm of the guide 48 is adjusted so that it is centered in a vertical plane of the scriber assembly 44 and the column 12. The dotted position 48′ of the guide 48, illustrates an alternate position for the guide in the event the template 60 may be at a higher position relative to the surface 70 to be scribed.

Figure 7:
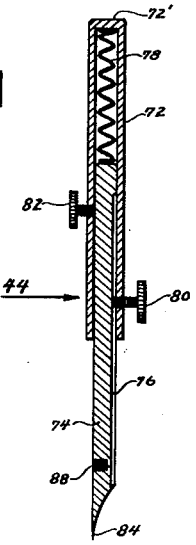

Referring to Fig. 7, the scriber assembly 44 includes a rectangular housing 72 for slidably receiving the yieldable scribe 74 having a pointed end or scribing part 84. A spring is interposed between the inner end of the scribe 74 and the end wall 72′ of the housing 72 to urge the scribe outwardly. The outward movement of the scribe 74 is limited by the thumbscrew 80 cooperating with a groove 76 in the scribe 74, the groove terminating just short of the upper end of the scribe. To ease the movement of the scribe 74 in the housing 72 it is preferable to relieve the corners of the housing in any suitable manner. A locking thumbscrew 82 is also provided to bear against the opposite face of the scribe 74 to lock it in position if desired. The lower end of the scribe is also provided with a threaded recess 88 for attachment of an offset scribing means, such as that indicated at 45 in Fig. 1.

An alternate modification of the scribing assembly is shown in Fig. 8. In this adaptation an aligning rod 86 is fixed to the upper wall 72′ of the housing 72 and extends downwardly to cooperate with a passage 98 in the yieldably scribing member 74. The spring 78 surrounds the rod 86 and in this way a somewhat smoother yieldable action of the scribe 74 may be obtained.

The scribing assemblies in Figs. 7 and 8 have been illustrated with pointed end parts 84 for scribing a fine line. Fig. 9 illustrates an embodiment of the invention wherein a small roller 94 having a sharp edge part may be used to form either a slight indentation in the surface being scribed or to form an ink line thereon. For this purpose an offset arm 90 is fastened to the body 74 of the scribe to carry the roller 94. Since the scribe is spring loaded, a constant pressure will be exerted on the roller so that on soft materials a fine line will indicate its path. Moreover on reversely curved surfaces a roller may greatly facilitate the scribing operation. In the case of hard materials it may be desirable to form an ink line on the surface to be marked and for this purpose I have illustrated a small absorbent pad 96 held in contact with the upper edge of the wheel 94 by a transverse bracket 92 fastened to the offset arm 90.

To operate the device as arranged in Fig. 1, the single template 60 is positioned above the curved surface 70 so that the projection of the line of the template perpendicularly of the template will describe the desired curve on the curved surface. With the template thus arranged relative to the surface 70, both are placed on a plane P with the template 60 parallel thereto. The scribing device is then adjusted so that when the base 10 is resting on the plane P the front edge of the guide 48 can be brought into contact with the edge of the template 60 substantially as illustrated. The scribing assembly 44 is then adjusted so that the yieldable action of the scribe 74 with the offset pointer 45 for scribing the surface will have sufficient vertical displacement to compensate for the irregularities in the curved surface 70. It may, of course, be necessary from time to time to readjust the position of the scribing assembly 44 so that the offset pointer 45 is always urged in contact with the surface 70. The horizontal position of the pointer 45 is then adjusted so that the point thereof is on a vertical axis with the front or template contacting edge of the guide 48. The device is then positioned with the guide 48 in contact with the template and with the pointer 45 resting on the surface 70 to be scribed. The entire unit is then moved slowly about the template 60 with the base 10 firmly in contact with the plane P at all times. With this arrangement, although it is preferable to move the device about the template so that it is always perpendicular to the edge of the template it is not essential since any deviation from this condition will merely result in a rotation of the device about an axis determined by the leading edge of the guide 48 and the pointer 45.

It is apparent, therefore, that with this unit surfaces may be scribed accurately and rapidly and without the necessity of projecting individual points on the template 60 to the surface 70 and then approximating a curve through the points thus located. Moreover, this device eliminates the need for two templates 60 positioned one above the other or a single template of substantial thickness to assist in the determination of the vertical lines to be projected according to present methods known to me.

Another important feature of this invention resides in the facility with which a plurality of parallel lines can be scribed on a curved surface such as the surface 70 without the need for a separate template for each line to be scribed. For instance, let us assume that after scribing the line a on the surface 70 it is desired to scribe a second line b 3/16 of an inch inside the first line. As pointed out, with conventional systems with which I am familiar, a new composite or double template assembly would be positioned above the surface as previously described and the line b would be projected by the point-by-point system. This, as can be clearly seen, would approximately double the time required for the scribing of two concentric lines. With my apparatus, however, the template 60 is also used for scribing the line B, and I accomplish this by adjusting the transverse position of the pointer 45 by means of the vernier 28 to displace the pointer precisely 3/16 of an inch ahead of the guide 48. The line b is then scribed on the surface 70 in precisely the same manner as the line a except that in this instance it is necessary to be somewhat more careful in the movement of the machine about the template since slight deviations from a perpendicular to the tangent of the curve at any point will displace the pointer 45 from its true position. Slight deviations of the apparatus however from this perpendicular position result only in very slight movement of the pointer 45, and I have actually found that I can scribe a more accurately positioned line in this manner than is obtainable with the point-by-point projection system I have previously referred to.

Figure 3:
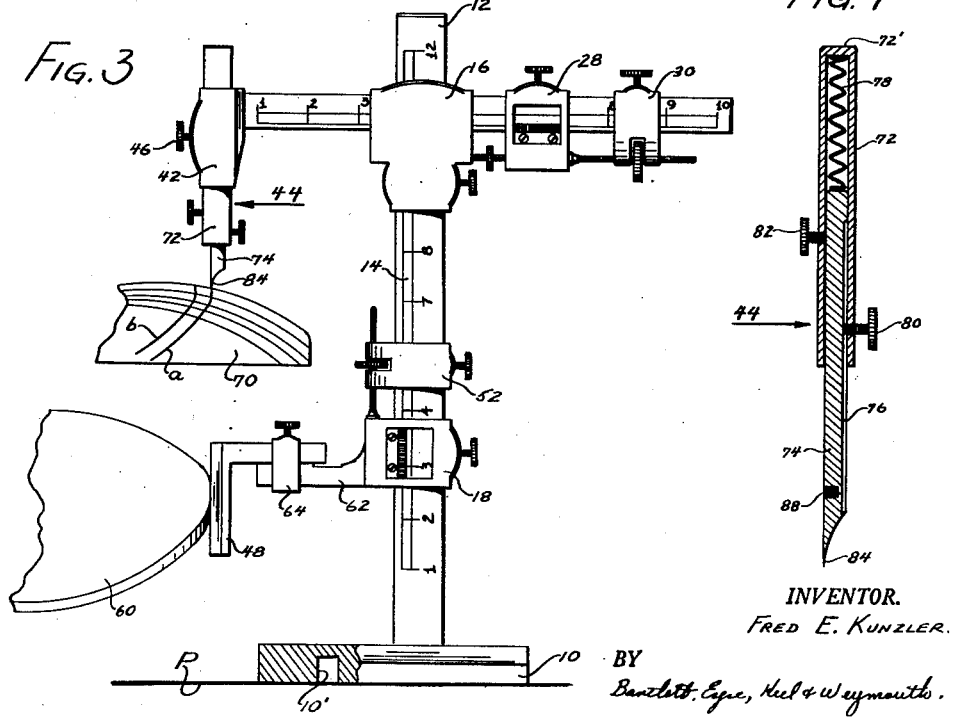

In some instances it is desirable to position the template at a point below the surface 70 and I have therefore illustrated in Fig. 3 the method by which this can readily be accomplished with my new and improved device. In this figure, I have also illustrated the method of using the device without the offset pointer 45 illustrated in Fig. 1.

With the template positioned below the surface 70 the cross carrier 18 is positioned below the scribing cross-carrier 16 with a somewhat smaller guide 48 positioned substantially as previously described in connection with Fig. 1. The cross-carrier 16 is then positioned in a manner previously described on the upper part of the column 12 with the pointer 84 in axial alinement with the template contacting edge of the guide 48. With this arrangement the line a is then scribed on the surface 70 in precisely the same manner as set forth in connection with Fig. 1, and any other parallel lines, such as line b, may also be readily and easily scribed with the use of the same template and without in any way disturbing the position of the template relative to the surface 60 for scribing the line a. It is also to be noted that the parallel lines, such as line b, can be scribed on either side of the line a with equal facility.

Still another embodiment of my invention is illustrated in Fig. 4. In this embodiment the cross-carrier 16 is of slightly different construction to permit it to be positioned more closely to the cross-carrier 18 when in the position illustrated on column 12. Although I have shown in this figure a separate vernier 28 and locking means 30 associated with the cross-carrier 16, the vernier 28 may be incorporated as part of the cross-carrier 16 substantially as illustrated at 100 in Fig. 5. In the modification shown in Fig. 5 the transverse adjustment of the slide 24 is accomplished by securing the lock 30 in position on the slide 24 and then by rotation of the wheel 34 threadedly engaged with the screw 36, the desired degree of movement can be attained.

The arrangement shown in Fig. 4 is particularly useful for scribing irregular openings on plane or compound curved surfaces. The template 60 is fastened on top of the curved surface 70 by means of a suitable pillar 102 of plaster of Paris or other similar material frequently used by the industry for this purpose. With this arrangement the template 60 also acts as the plane P in Figs. 1 and 3 on which the base 10 of my apparatus rests. The cross-carrier 18 with its guide 48 is then adjusted so that the inner edge of the guide 48 contacts the edge of the template 60. The slide 24 and the cross-carrier 16 are then adjusted to bring the pointer 46 of the scribing assembly 44 so that its end portion is in axial alinement with the controlling edge of the guide 48 and with the point in contact with the surface 70. The line a is then scribed by rotating the device so that the guide 48 is always in contact with the edge of the template 60 and the slide 24 lies in a vertical plane perpendicular to a tangent to the edge of the template through the point of contact between the guide and the template. In this modification, of course, parallel lines b and c may also be scribed on the surface 70 in the manner in which the line b in Figs. 1 and 3 were scribed and, of course, with equal facility.

Another important advantage of my invention relates to the scribing of circular openings in irregularly curved surfaces without the use of templates or other guiding means and is particularly useful in the aircraft industry wherein circular openings must be formed in the skin of the fuselage and wings to receive gun carriers, vents, and the like. In the case of guns, for instance, it is usually desired that they be positioned at some precise horizontal and vertical angle relative to the center line of the fuselage. These openings also must be precisely formed so as to prevent air leaks between the skin and the outer surface of the gun structure projecting therethrough. Moreover, the plotting of this opening on irregular surfaces such as the nose, which is a compound curve, is complicated by the angle of the gun structure with the center line of the fuselage.

With my apparatus a hole of this type can be scribed accurately and precisely and in less than one-fourth the time normally required. In Fig. 6, which is illustrative of this procedure, let the surfaces 110 represent a compound curved surface, such as the nose of an aircraft through which a gun structure is to protrude. The center line of this opening is first located and is illustrated in the figure at 112. With the location of this center line established, a platform 114 is then formed at the center of the opening to be scribed and the face of the platform 110 is arranged so that it is parallel to the plane of the opening to be formed. A pivot pin 116 is then set in the platform 114 so that its axis coincides with the axis 112 of the hole to be scribed and this pin cooperates with a recess 10' in the base 10 of my scribing device so that the base 10 may be readily rotated thereabout. In this method of using my device the guide holding cross-carrier 18 is omitted, the cross-carrier 16 being positioned on the column 12 in the manner previously set forth. The transverse position of the slide 24 is then adjusted by means of the vernier 28 to position the yieldable scribing assembly 44 at a predetermined horizontal distance from the center line 112; that is, a distance equal to the radius of the circle to be scribed. The vertical position of the assembly 44 is then adjusted so that the pointer 84 will be yieldably urged in contact with the surface 110. The hole or opening 120 can then be quickly and easily scribed on the surface 110 merely by rotating the unit about the pivot pin 116.

In each of the forms of the invention shown in the figures it is possible to employ the modified scribing assemblies shown in Figs. 8 and 9.

As previously pointed out, my invention materially reduces the time and cost required for projecting plane curves on curved surfaces, and in some instances the time can be reduced by as much as 75% of that required by other methods known to me. Moreover, the resultant scribed or projected line obtained by my device is far more accurate since it is not formed by determining a plurality of individual points and then approximating the curve defined by those points, but rather it is formed by scribing a complete and continuous line closely and accurately following the line determined by the template. Furthermore, I can scribe a series of parallel lines by the use of a single template and without the necessity of repositioning different sized templates for each parallel line to be scribed, and I furthermore have overcome the necessity of using composite templates to facilitate the determination of the vertical lines to be projected, but can accomplish the projection more accurately and rapidly with only a single template.

I claim:

1. Means for projecting lines on compound curved surfaces comprising a movable base member, a column perpendicular to and supported by said base member, a member adjustably mounted on said column, means on said member for fixedly supporting a guide, a spring loaded scriber, and means for adjustably supporting said scriber on the column in a predetermined relationship to the guide whereby movements of the guide are translated in a predetermined manner to the scriber with the scriber resting on and following the contour of the surface being scribed in a direction transversely of the movement of the guide.

2. A scribing device for transferring line determined by a flat template to a surface spaced therefrom comprising a base member movable relative to the template, a perpendicularly positioned column on said base member, guiding means, a cross carrier adjustably mounted on said column for carrying said guiding means for cooperation with and movement in a plane parallel to the flat template, a second cross carrier adjustably mounted on the column and scribing means mounted thereon and longitudinally yieldable in a line parallel to the column, said scribing means being adjustable laterally of the column for alignment thereof with the guide and adjustable longitudinally of the column to ride on and scribe the spaced surface.

3. A scribing device according to claim 2 wherein said second cross carrier comprises a transverse graduated member, means for adjustably mounting said member on the column, means for transversely adjusting said member relative to the column and means on one end of said member for supporting the spring loaded scribing assembly.

4. A scribing device comprising a base member, a column supported by said base member, a pair of adjustable cross carriers on said column, a guide member on one of said cross carriers for cooperation with a template and scribing means carried by the other carrier including means for adjusting it relative to the guide, said scribing means comprising a hollow housing having an end wall, a scriber slidably mounted in said housing with means to limit the outward movement thereof, a rod fastened to the end wall of the housing and extending downwardly therein, a central longitudinal opening in said scriber for reception of the rod and spring means between the scriber and the end wall and surrounding the rod to urge the scriber outwardly of the housing.

5. A scribing device comprising a base member, a graduated column mounted on and carried by said base member, guiding means, and a cross carrier adjustably mounted on said column for supporting the guiding means and having a venier scale for cooperation with the graduations on said column, a second cross carrier on said column and a graduated slide adjustably mounted therein for transverse movement relative to the column, a venier on said second cross carrier for cooperation with the graduations on the slide, and a yieldably mounted scribing device on one end of the transverse slide and adjustable in a plane perpendicular to the graduated slide.

6. A device for scribing on a compound curved surface a projection of a plane curve comprising in combination a base having a surface parallel to the plane of the curve to be projected, a column extending perpendicular to said base, a transverse member carried by said column parallel to the plane of said base, means for adjusting said transverse member longitudinally of said column for varying the spacing of the transverse member from the surface of said base, scribing means carried at one end of said transverse member and yieldably mounted thereon for movement perpendicular to the plane of said base, and means for adjusting said transverse member transversely of said column for varying the spacing of said scribing means from said column.

7. The combination according to claim 6 including cooperating graduated scales on said column and on said transverse member for facilitating adjustment of said transverse member on said column.

FRED E. KUNZLER.

REFERENCES CITED

The following references are of record in the file of this patent:

UNITED STATES PATENTS

| Number | Name | Date |
|---|---|---|
| 507,395 | Walsh | Oct. 24, 1893 |
| 542,443 | Hand | July 9, 1895 |
| 652,521 | Pratt | June 26, 1900 |
| 657,136 | Schultz | Sept. 4, 1900 |
| 845,234 | Hays | Feb. 26, 1907 |
| 967,448 | Sechler | Aug. 16, 1910 |
| 1,002,749 | Peterson | Sept. 5, 1911 |
| 1,276,261 | Peterson | Aug. 20, 1918 |
| 1,886,768 | Watson | Nov. 8, 1932 |
| 1,970,476 | Schutze | Aug. 14, 1934 |
| 2,009,671 | Mueller et al. | July 30, 1935 |
| 2,352,695 | Clausing et al. | July 4, 1944 |
| 2,383,208 | Mustered | Aug. 21, 1945 |

FOREIGN PATENTS

| Number | Country | Date |
|---|---|---|
| 46,597 | Switzerland | Mar. 26, 1909 |
| 545,026 | Germany | Feb. 25, 1932 |
| 567,234 | Great Britain | Feb. 5, 1945 |